United States Patent Office 3,597,383
Patented Aug. 3, 1971

3,597,383
PROCESS FOR MAKING A GRANULAR, DRY POLYESTER RESIN MOLDING COMPOSITION AND THE PRODUCT PRODUCED THEREBY
Robert James Shrontz, Perrysburg, Ohio, assignor to American Cyanamid Company, Stamford, Conn.
No Drawing. Filed Feb. 10, 1969, Ser. No. 798,137
Int. Cl. C08g 51/04, 51/34
U.S. Cl. 260—32.8
8 Claims

ABSTRACT OF THE DISCLOSURE

A process for making a granular polyester resin molding composition comprising mixing two different unsaturated polyester resins in an inert organic liquid dispersing medium in the presence of a finely divided particulate mineral filler and a peroxide catalyst and removing the liquid medium.

BACKGROUND OF THE INVENTION

Unsaturated polyester resin compositions are well known in the art and are generally prepared by reacting an $\alpha,\beta$-ethylenically unsaturated carboxylic acid with a dihydric alcohol. The U.S. Pat. 2,255,313 is illustrative of such prior art and further shows the use of a cross linking monomeric material such as styrene in such polyester compositions. It is additionally known to use fillers in unsaturated polyester resins of a wide variety of distinct types such as the particulate mineral fillers or the fibrous fillers, including the organic and inorganic fibrous material; more particularly, cellulosic fibers and glass fibers. These polyester resin molding compositions of the prior art come in a plurality of different forms such as rope, slug, putties, granules and the like.

FIELD OF THE INVENTION

This invention is in the field of dry, granular, unsaturated thermosetting resin molding compositions containing a mixture of an unsaturated thermosetting polyester resin which is soluble in methylene chloride and an unsaturated thermosetting polyester resin which is insoluble in methylene chloride and containing certain quantities of a finely divided particulate mineral filler and a peroxide catalyst for said unsaturated polyester resins, and to the process of preparing the same. Still further, this invention relates to a granular, dry polyester resin molding composition that contains, in addition to those ingredients set forth hereinabove, additional quantities of glass fibers which have a fiber length not exceeding about ¼″ and preferably not exceeding about ⅛″.

DESCRIPTION OF THE PRIOR ART

The closest prior art of which the instant applicant is aware are the U.S. Pats. 2,819,243 and 3,340,220.

SUMMARY OF THE INVENTION

This invention relates to a process for making a granular, thermosetting polyester resin molding composition comprising mixing a normally solid unsaturated thermosetting polyester resin, which is soluble in methylene chloride, with an unsaturated thermosetting polyester resin, which is insoluble in methylene chloride, in the presence of an inert organic liquid dispersing medium and a finely divided particulate mineral filler and a peroxide catalyst for said unsaturated polyester resins, until the ingredients are adequately mixed and then removing said dispersing medium to produce a granular, dry, polyester resin molding composition wherein the weight ratio of said soluble polyester resin to said insoluble polyester resin is between about 80:20 and 5:95, respectively.

The unsaturated polyester resins which are soluble in methylene chloride are commonly known unsaturated polyester resins prepared by reacting a symmetrical $\alpha,\beta$-ethylenically unsaturated dicarboxylic acid such as maleic acid or maleic anhydride with a dihydric alcohol. Any of the conventional dihydric alcohols may be used such as ethylene glycol, propylene glycol, diethylene glycol, butanediol-1,3 butanediol-1,4 and the like. Obviously, these glycols may be used in combination with one another. These unsaturated polyester resins are normally solid and will frequently contain in addition to the maleic acid or the maleic anhydride a dicarboxylic acid free of non-benzenoid unsaturation such as phthalic anhydride, iso-phthalic acid, tetrachloro phthalic acid and the like. These polyester resins are disclosed in the U.S. Pats. 2,255,313 and 2,443,735-41 inclusive which patents are incorporated herein by reference. In these cited patents, cross linking agents such as monomeric styrene, monomeric diallyl phthalate and the like are used. In the present compositions no monomeric cross linking agents are used since these polyesters are self-crosslinkable. A specific illustration of a suitable unsaturated polyester resin is polydiethylene glycol maleate.

The unsaturated polyester resins used as the second component in the molding compositions of the present invention are those which are insoluble in methylene chloride and are prepared by reacting fumaric acid with a glycol having the formula $$HO-(CH_2)_n-OH$$

wherein $n$ is any digit between 2 and 6 inclusive. Additionally, glycols which may be used are the cyclo aliphatic, symmetrical glycols such as 1,4-cyclohexane dimethanol. Among the acrylic glycols which may be used in the practice of the process of the present invention are ethylene glycol, propanediol-1,3, butanediol-1,4, pentanediol-1,5, and hexanediol-1,6. These unsaturated thermosetting polyester resins which are insoluble in methylene chloride are by definition soluble to the extent that less than 10 % of a given quantity of the unsaturated polyester will dissolve in the methylene chloride at ambient temperature and therefore are in the category of substantially insoluble.

The insoluble polyester resin may be used with the soluble polyester resin in a weight ratio of 95:5 to about 20:80, respectively; and preferably 90:10 to about 40:60, respectively, same basis.

The liquid dispersing medium should be in the nature of a normally liquid inert organic solvent which is inert to either of the unsaturated polyester resins, in which said resins will be dissolved on the one hand or be dispersed in the other. In addition, the solvent should be capable of being removed by evaporation from resins and fillers at a temperature below 200° F., preferably 125° F. Among the inert solvents which may be used in practicing the process of the present invention are benzene, toluene, chloroform, methylene chloride, acetone, methyl ethyl ketone and the like. Methylene chloride is preferred because it will readily dissolve the first polyester resin but will disperse the second polyester resin without dissolving it. In order to facilitate dispersion of the insoluble polyester into the mix, it is recommended that it be added as finely divided particles in a size between 80 mesh and 325 mesh and preferably 140 mesh to 200 mesh. The amount of the inert solvent used should be only that amount which is sufficient to make a slurry that permits the mixing of the components in such a way so as to provide for a homogeneous mix in the slurry per se and a homogeneous distribution of the resins and other components in the ultimate product produced. One can therefore use 10% by weight of the dispersing medium based on the total weight of the dry components or larger amounts such as 20%, 40% and higher. However, since the inert dispersing medium must be removed from the slurry after mixing is substantially completed, nothing is to be gained by using excess quantities of the dispersing medium; and as a consequence, large excessive quantities should be avoided.

The liquid dispersing medium used in the process of the present invention must be capable of dissolving the maleate type of polyester resin and incapable of dissolving the fumarate type of polyester resin. As a consequence, solvents that will dissolve both of these resins cannot be used; and by the same token, "solvents" that will dissolve neither of these polyester resins cannot be used.

The amount of the particulate mineral filler used in the preparation of the molding compositions may be varied between about 20:100 filler:unsaturated polyester resins to 500:100 filler:unsaturated polyester resins, respectively. It is preferred to use 150:100 to about 350:100 filler to total polyester resin and for optimum results 300:100 filler to polyester resin, respectively.

Among the finely divided particulate inert mineral fillers which may be used in the process and product of the present invention are finely divided calcium carbonate, aluminum hydroxide, hydrated alumina, kaolins, antimony trioxide, powdered glass and other silicon-containing materials, clay, sand, and the like. As used, these finely divided particulate mineral fillers generally have uniform dimensions in all directions.

The unsaturated polyester resins described in this invention are self-crosslinkable, i.e., will convert to a thermoset state without the use of a cross linking monomer. A cross linking catalyst is required of which a substantial plurality are known and are used in the art and they are generally used in conventional catalytic quantities. The preferred cross linking catalysts are the peroxides such as benzoyl peroxide, dicumyl peroxide, t-butyl perbenzoate, di-t-butyl peroxide, methyl ethyl ketone peroxide, and the like. These catalysts are conventionally used in amounts about 0.1% to about 5% by weight based on the total weight of the unsaturated thermosetting polyester resin and preferably 1% to 2% by weight.

In a sense, the present invention relates to the process of making a mineral filled molding composition devoid of any glass fibers, however, a second facet of the inventive concept resides in adding glass fibers to the first molding composition. These glass fibers should have a maximum length not exceeding about ¼" and preferably not exceeding about ⅛". These glass fibers are available commercially and can be advantageously employed as chopped rovings or chopped strand. The amount of the fibers which are added as a preferred embodiment to the granular, dry polyester resin molding composition may be varied between about 1% to about 60% by weight based on the dually filled molding composition. Preferably one would use between about 2% to 15% by weight of the glass fibers based on the total weight of the final molding compositions. These glass fibers need not be of uniform length, and in one operation the glass fibers of a plurality of different lengths may be used. However, the maximum length of the longest fibers used should not exceed about ¼". The glass fibers in all instances will, of course, always have a significantly greater length than width. It is preferred to make use of glass fibers which are cut to the selected length from a glass fiber product having a plurality of individual glass strands in substantially parallel relationship.

The glass filled molding compositions of the present invention can flow easily through customary feeding devices of molding machines which are presently using phenolic resins and known reinforced alkyd granular types. Intimate mixing of the glass fibers and the granular alkyd occurs during the actual molding operation. Screw injection and transfer molding machines accomplish adequate mixing. However, in straight compression molding undispersed glass fibers have been observed when this dry blend is used.

In order that the concept of the present invention may be more completely understood, the following examples are set forth in which all parts are parts by weight.

EXAMPLE 1

Into a signal blade mixer there is introduced 8.3 parts of a commercially available polyester resin prepared from maleic anhydride, tetrachlorophthalic anhydride and ethylene glycol), and which is soluble in methylene chloride, 13.3 parts of a commercially available ethylene glycol fumarate polyester resin which is insoluble in methylene chloride, 31.1 parts of hydrated clay, 10.0 parts of anhydrous calcium sulfate, 20 parts of hydrated alumina and 0.4 part of benzoyl peroxide. A sufficient amount of methylene chloride is introduced into the mixer in order to provide 20% by weight based on the total weight of the above ingredients. Thereupon the mixer is closed and heated at 125° F. while thoroughly mixing the components in a slurry-like form. The methylene chloride insoluble polyester is added as a finely divided powder, i.e., smaller than 80 mesh, while the soluble polyester is added to the mixer as a solution in methylene chloride. After the ingredients are adequately mixed, the mixer is uncovered in order that the methylene chloride vapors can be vented to an evacuated duct system. The mixing and grinding continues and eventually the grinding action of the mixer blades reduces the product to a granular form, preferably in the particle size range 6 to 200 mesh. The product is then ready for use as a molding composition. However, if a further reduction in particle size is desired, the dried, cooled product can be ground further in a hammer mill. The product thus produced is highly suitable for use in making molded buttons.

EXAMPLE 2

Example 1 is repeated in all essential details except that the product in granular form is sieved through a 6 mesh screen. Thereupon, 10 parts by weight of ⅛" chopped glass strands are introduced into a mixer and a gentle tumbling action is sufficient to dry blend the glass fibers and the alkyd resin. Because of similar densities, these two components remain relatively well distributed even after being packaged.

If only a methylene chloride soluble polyester resin is employed in the process of Example 1, the mix becomes very stiff as the solvent is removed and considerable internal heat is generated. This heat development occurrence is particularly detrimental because of the presence of heat sensitive peroxide catalysts which have been incorporated into the mix prior to the mixing step; and the thermosetting characteristic of the polyester resin would thereby be converted at least in part to an an advance stage of cure and may, in fact, become thermoset. On the other hand, if only a methylene chloride insoluble polyester resin is employed, the mix does not develop enough viscosity for adequate dispersion of the fillers and pigments.

EXAMPLE 3

Example 1 is repeated in all essential details except for the ingredients charged to the sigma blade mixer. In this instance 13.2 parts of a commercially available polyester resin (prepared from maleic anhydride, tetrachlorophthalic anhydride and ethylene glycol), and which is soluble in methylene chloride, 8.4 parts of a commercially available ethylene glycol fumarate polyester resin which is insoluble in methylene chloride, 0.4 part of t-butyl perbenzoate, 32.8 parts of hydrated alumina, 9.8 parts of cellulosic fibers having a length of less than 100 microns, 30.7 parts of finely divided calcium carbonate, 1.7 parts of zinc stearate and 3.0 parts of a selected pigment. Acetone is used as the dispersing medium in an amount of about 20% by weight based on the total weight of the ingredients. The process is carried out until the mixer blades reduce the product to a granular form.

I claim:

1. A process for making a granular, thermosetting polyester resin molding composition comprising mixing in the presence of a liquid dispersing medium, an unsaturated polyester resin which is soluble in said liquid, and an unsaturated polyester resin which is relatively insoluble in said liquid, with a finely divided particulate mineral filler and peroxide catalyst for said unsaturated polyester resins, until the ingredients are adequately mixed and then removing said dispersing medium to produce a granular dry polyester resin molding composition wherein the weight ratio of said soluble polyester resin to said insoluble polyester resin is between about 80:20 and 5:95, respectively, wherein said relatively insoluble unsaturated polyester resin is soluble to the extent of less than 10% in methylene chloride at ambient temperature, and wherein said process is carried out in the absence of any vinyl monomer.

2. The process according to claim 1 in which the dry, granular polyester resin molding composition is then blended in a dry state with from about 1% to about 60% by weight of a glass fibrous filler having a fiber length not exceeding about ¼" whereby a granular, dry, free-flowing molding composition is produced.

3. The process according to claim 2 in which the glass fibrous material is present in an amount varying between 2% and 15% by weight based on the total weight of the molding composition.

4. The process according to claim 1 in which the weight ratio of said soluble polyester resin to said insoluble polyester resin is between about 10:90 and 60:40, respectively.

5. The process according to claim 2 in which the weight ratio of said soluble polyester resin to said insoluble polyester resin is between about 10:90 and 60:40, respectively.

6. The process according to claim 1 in which the liquid dispersing medium is selected from the group consisting of methylene chloride, benzene, toluene, chloroform, acetone, and methyl ethyl ketone, or mixture thereof.

7. The product produced according to the process of claim 1.

8. The product produced according to the process of claim 2.

References Cited

UNITED STATES PATENTS 2,857,359   10/1958   Schollick et al. _____ 260—860X

FOREIGN PATENTS 815,084   6/1959   Great Britain _____ 260—860

MORRIS LIEBMAN, Primary Examiner

L. T. JACOBS, Assistant Examiner

U.S. Cl. X.R.

260—33.6, 33.8, 40

UNITED STATES PATENT OFFICE
CERTIFICATE OF CORRECTION

Patent No. 3,597,383　　　　　　　　Dated November 18, 1971

Inventor(s) ROBERT JAMES SHRONTZ

It is certified that error appears in the above-identified patent and that said Letters Patent are hereby corrected as shown below:

Column 2, Line 33, "acrylic" should read -- acyclic --.

Column 4, Line 5, "signal" should read -- Sigma --.

Column 4, Line 7, should have parenthesis sign -- ( -- before word prepared.

Signed and sealed this 28th day of March 1972.

(SEAL)
Attest:

EDWARD M. FLETCHER, JR.　　　　　ROBERT GOTTSCHALK
Attesting Officer　　　　　　　　　Commissioner of Patents